Oct. 31, 1933.                J. A. GREIDER                1,933,170
FISH LURE
Filed Sept. 19, 1932
Fig. 1.
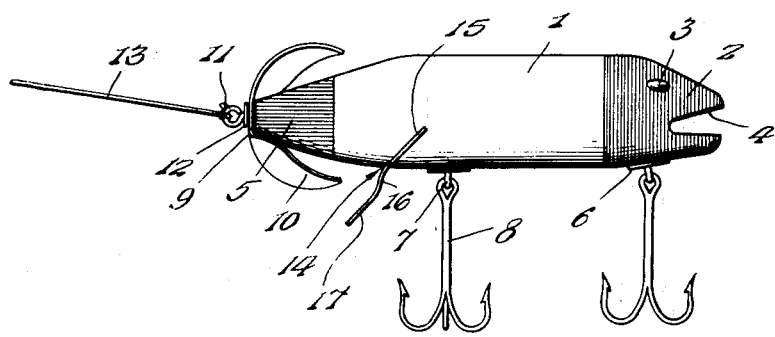
Fig. 2.
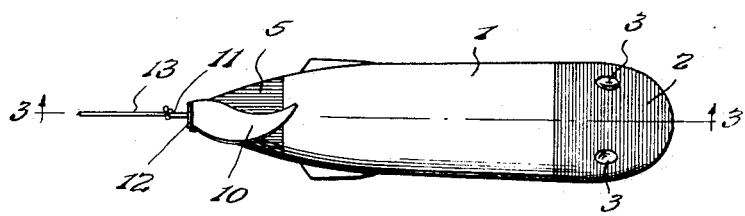
Fig. 3.
Fig. 4.
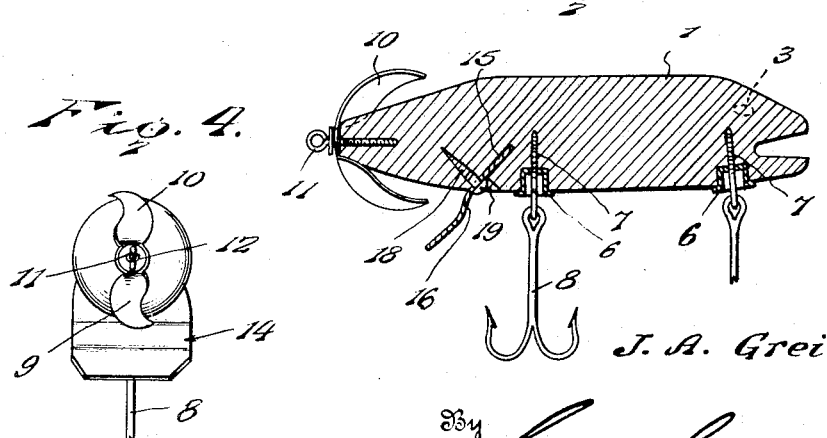
Inventor
J. A. Greider.
By Lacey & Lacey, Attorneys Patented Oct. 31, 1933

1,933,170

UNITED STATES PATENT OFFICE 1,933,170

FISH LURE

Jethro A. Greider, Spear Lake, Ind.

Application September 19, 1932
Serial No. 633,872

2 Claims. (Cl. 43—46)

This invention relates to an improved fish lure.

One object of the invention is to provide a fish lure having a body shaped to represent a minnow and adapted to receive a fishing line at its rear end so that when said line is pulled, the body will present the appearance of a minnow retreating through the water and tend to attract fish to hooks carried by the body.

Another object of the invention is to provide a device of this character employing a rudder which will cause the body to dive when a sudden pull is given to the line.

A further object of the invention is to provide a fish lure having a spinner at the rear end of the body which will rotate and tend to attract fish as the body is drawn rearwardly through the water.

And a still further object of the invention is to provide a fish lure which will be simple in construction and highly efficient in use.

Other and incidental objects of the invention, not specifically mentioned in the foregoing, will be apparent during the course of the following description.

In the drawing:

Figure 1 is a side elevation view of the complete device,

Figure 2 is a top plan view of the device,

Figure 3 is a longitudinal vertical sectional view of the device on the line 3—3 of Figure 2, looking in the direction indicated by the arrows, And Figure 4 is an end view of the device.

Referring now more particularly to the drawing, the numeral 1 indicates a body which is preferably formed of light wood and is shaped to present the appearance of a minnow. The body may be painted in bright colors, such as gold, cream, silver, orange, black, or any other color or combination of colors. The body is preferably provided with an outside coating of waterproof varnish which will protect the colors from the water. The body is preferably painted in bright colors so as to attract fish more readily. The body 1 is provided with a head 2 having eyes 3 and an open mouth 4. The rear end of the body is reduced to define a tail portion 5. Embedded in the under side of the body 1 are spaced sockets 6 which are preferably formed of metal, one of said sockets being disposed beneath the mouth 4 and the other of said sockets being disposed substantially medially of the length of the body in alignment with the first mentioned socket. Extending through the sockets 6 and embedded in the body 1 are screw eyes 7 and carried by said screw eyes are barbed fish hooks 8 which may be of any desired construction.

Rotatably connected with the tail portion 5 of the body 1 is a spinner 9 having blades 10 which are curved longitudinally and are bent toward the forward end of the body to lie in substantially parallel spaced relation thereto. Extending through the central portion of the spinner 9 and rotatably connecting said spinner to the tail portion 5 is a screw eye 11. Overlying the outer face of the spinner 9 and disposed between said spinner and the screw eye is a bearing washer 12. The screw eye 11 is adapted to receive a fishing line, a portion of which is indicated by the numeral 13. It should be understood that the fishing line may be of any preferred construction.

Associated with the body portion 1, rearwardly of the centrally disposed hook 8, is a rudder, formed of metal, which is indicated in general by the numeral 14. The rudder is of the shape substantially to conform to the shape of the trigonometrical tangential curve. That is to say, the rudder comprises a straight portion 15 which is disposed within the body 1 transversely thereof and at an angle of substantially 45° to the horizontal. The rudder is bent medially to provide a portion 16 which is at right angles to the horizontal. The portion 16 will provide a retarding effect to a flow of water passing along the body of the device so that a more pronounced effect for the rudder may be obtained. An exterior portion 17 of the rudder is then bent to a parallel plane with the portion 15. Connecting the rudder to the body 1 is a screw 18 which is extended through the central portion of the rudder and embedded in the body 1. The screw 18 will be seated in a recess 19 formed in the body. It is pointed out that inasmuch as the rudder is formed of two straight portions connected by a central portion in angular relation thereto, the rudder will be of relatively great strength.

When the device is in use the fishing line 13 is attached to the screw eye 11, as is seen in Figures 1 and 2 of the drawing. It will be observed that the fishing line is connected to the rear or tail portion of the body instead of to the forward or central portion thereof, as is the usual practice. This is done for the reason that it is desired that the minnow retreat through the water. It is well known that game fish prefer to swallow small fish, head first, rather than tail first and, therefore, the retreating minnow will present its head to the oncoming game fish. The hooks are baited and the device is cast in the conventional manner. However, after the device has hit the water and the line pulled the rudder 14 will engage the water and cause the device to dive as the line is pulled. A sudden pull upon the line will, therefore, cause the device to dive below the surface of the water, the greater the pull upon the line, the greater depth of the dive of the device. The spinner 9 will rotate as the device is pulled through the water so as to set up somewhat of a commotion in the water and attract fish to the device. It is probable that the rotation of the spinner will cause a slight chattering noise which will also tend to attract fish to the device. It is obvious that when a fish tries to swallow the device head first, one or both of the hooks 8 will engage in the fish's throat and permit of the fish being drawn up in the usual manner.

Attention is directed to the fact that inasmuch as the rudder is provided with a curved central portion 16, the screw extending through said central portion will be accorded a better hold so that looseness of the rudder in the body will be prevented. The curved portion of the rudder will also permit a great suction immediately adjacent the forward portion as the device is drawn rearwardly through the water so that the body will be more effectively drawn downwardly when the line is suddenly tightened or jerked. Attention is further directed to the fact that the rudder, being curved, will present more surface to the water and will tend to give the body a rocking or right and left motion in the water which will give the impression of a live fish swimming in the water. Therefore, a more attractive bait will be provided. It is to be noted that the attractiveness of the device is further augmented by the painting of the body in livid colors.

It is well known that certain kinds of fish respond to fish lures of certain shapes and it is for this reason that I wish it understood that my lure may be formed in different shapes and sizes and may be of various weights so that it will be suitable for the different kinds of fish.

The device may be made so that it will be adapted for surface, semisurface,, or deep water fishing and, of course, as before stated, the device may be painted in numerous colors and combinations of colors, as for example, the body may be painted in variated colors of green, yellow, red, white and blue, and it may be varnished. The metal parts will be nickel plated and the eyes, of course, will be of highly polished glass.

Attention is further directed to the fact that the body may be provided with from one to eight, or any other suitable number, of double or triple common hooks.

Having thus described my invention, I claim:

1. A device of the class described including a body, a hook carried by the body at its forward end, fishing line engaging means carried by the body at its rear end, a spinner rotatably connected to said rear end of the body by said fishing line engaging means, a rudder connected with the body and provided with a straight portion extending into the body at an angle, a central portion extending at right angles to the length of the body, and a straight portion extending in a parallel plane to said first mentioned straight portion, said rudder providing means whereby the body will be caused to dive as it is drawn rearwardly through the water by the fishing line and said rudder cooperating with said spinner for giving the body a life like motion tending to attract fish to the hook.

2. A device of the class described including a body, a spinner rotatably mounted at one end of said body, a rudder connected with the body and inclined toward the spinner, said rudder being provided with a straight portion extending into the body, a central portion extending at right angles to the length of the body and adapted for retarding a flow of water past the rudder, and a straight portion extending in a parallel plane to said first-mentioned straight portion, all of said portions cooperating for providing a reinforced rudder, said spinner being adapted for directing the water toward the rudder and said rudder being adapted for guiding the device downwardly incidental to rearward movement through the water.

JETHRO A. GREIDER. [L. S.]